United States Patent
Yasuda et al.

(10) Patent No.: US 9,366,408 B2
(45) Date of Patent: Jun. 14, 2016

(54) VEHICLE LAMP HAVING PLANT FIBER

(71) Applicants: LION IDEMITSU COMPOSITES CO., LTD, Tokyo (JP); KOITO MANUFACTURING CO., LTD., Tokyo (JP)

(72) Inventors: Hiroshi Yasuda, Sodegaura (JP); Kazuhito Osada, Shizuoka (JP); Fukashi Masuda, Shizuoka (JP); Takenao Yoshimura, Shizuoka (JP)

(73) Assignees: LION IDEMITSU COMPOSITES CO., LTD., Tokyo (JP); KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/416,099

(22) PCT Filed: Jul. 5, 2013

(86) PCT No.: PCT/JP2013/068527
§ 371 (c)(1),
(2) Date: Jan. 21, 2015

(87) PCT Pub. No.: WO2014/017274
PCT Pub. Date: Jan. 30, 2014

(65) Prior Publication Data
US 2015/0198301 A1    Jul. 16, 2015

(30) Foreign Application Priority Data
Jul. 24, 2012 (JP) ................................. 2012-163470

(51) Int. Cl.
*B60Q 1/00*    (2006.01)
*B60Q 3/00*    (2006.01)
(Continued)

(52) U.S. Cl.
CPC . *F21S 48/31* (2013.01); *B60Q 1/04* (2013.01); *F21S 48/15* (2013.01); *F21W 2101/10* (2013.01)

(58) Field of Classification Search
CPC ............ F21S 48/31; F21S 48/15; B60Q 1/04; F21W 2101/10
USPC ............................. 362/546, 544, 217.11, 404
See application file for complete search history.

(56) References Cited

U.S. PATENT DOCUMENTS 4,536,676 A * 8/1985 Maruyama ............... H01K 1/46
313/315
5,912,308 A * 6/1999 Das ..................... C08G 59/4014
525/480
(Continued)

FOREIGN PATENT DOCUMENTS

CN    101023133 A    8/2007
EP    1055863 A1    11/2000
(Continued)

OTHER PUBLICATIONS

ISR (PCT/ISA/210); issued Sep. 24, 2013 in related International Application No. PCT/JP2013/068527.
Written Opinion (PCT/ISA/237); issued Sep. 24, 2013, in related International Application No. PCT/JP2013/068527.
Extended European Search Report issued on Jan. 22, 2016 issued by the European Patent Office in counterpart European Application No. 13823539.5.

(Continued)

*Primary Examiner* — Anh Mai
*Assistant Examiner* — Glenn Zimmerman
(74) *Attorney, Agent, or Firm* — Sughrue Mion, PLLC

(57) ABSTRACT

There is provided a vehicle lamp which uses a lamp body formed from a resin composition containing a base resin and a plant fiber, wherein a mold which is used to mold the lamp body is not corroded, and wherein if the lamp is manufactured by using the lamp body, fogging or an appearance failure is suppressed from being generated on an inner side of a front cover during usage. A vehicle lamp includes a lamp body which is opened at a front thereof, and a front cover which is attached to the lamp body to close a front opening portion of the lamp body, and the lamp body is formed from a resin composition which contains a base resin, a plant fiber and an acid scavenger.

5 Claims, 1 Drawing Sheet

(51) Int. Cl.
  *F21V 11/00*  (2015.01)
  *F21V 15/01*  (2006.01)
  *F21S 8/10*   (2006.01)
  *B60Q 1/04*   (2006.01)
  *F21W 101/10* (2006.01)

(56) References Cited

U.S. PATENT DOCUMENTS

2011/0192243 A1* 8/2011 Tachiiwa ............ B29C 45/0025
                                                      74/89.23
2015/0036376 A1* 2/2015 Osada ................. F21S 48/1208
                                                      362/546

FOREIGN PATENT DOCUMENTS

| | | |
|---|---|---|
| JP | 03-002241 A | 1/1991 |
| JP | 06-080888 A | 3/1994 |
| JP | 2006111858 A | 4/2006 |
| JP | 2011-088997 A | 5/2011 |
| JP | 2011144318 A | 7/2011 |
| JP | 2012-018887 A | 1/2012 |
| WO | 2010138842 A1 | 12/2010 |

OTHER PUBLICATIONS

Communication dated Mar. 23, 2016, from the State Intellectual Property Office of People's Republic of China in counterpart Application No. 201380039387.5.

* cited by examiner

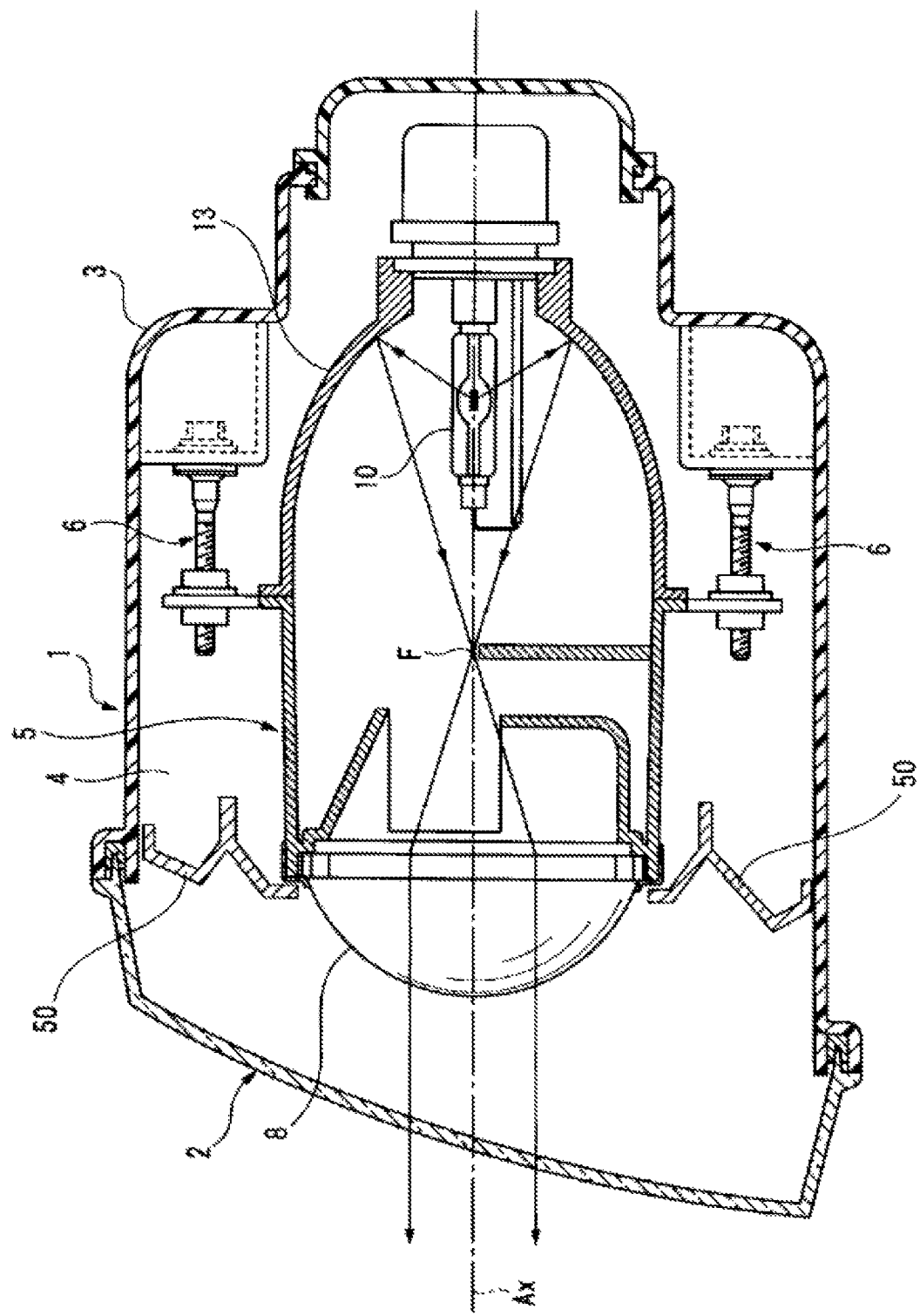

VEHICLE LAMP HAVING PLANT FIBER

TECHNICAL FIELD

The present invention relates to a vehicle lamp, and particularly, to a vehicle lamp which is lightweight and has high strength, which suppresses corrosion of a mold used to mold a lamp body, and which does not cause fogging or appearance failure on an inner side of a front cover during usage.

BACKGROUND ART

In recent years, it has been desired to reduce the weight of a vehicle, and for this purpose, the reduction in weight of respective parts which make up a vehicle is in progress. Lamps are included in those parts which are required to be reduced in weight.

In general, a vehicle lamp includes a lamp body which is opened at a front thereof, a front cover which is attached to the lamp body so as to close the front opening portion, an extension, a reflector, a light source, electric components and the like. In order to reduce the total weight of such a vehicle lamp, it is considered to be effective to reduce the weight of the lamp body which is generally formed from a resin material and which occupies a relatively large portion of the total weight of the vehicle lamp.

On the other hand, in a resin molded part which is formed from a resin material, if the resin molded part is formed only from a resin, a sufficient strength would not be obtained, and therefore, it is general practice to add a filling material (a filler) to a base resin. As a preferable filler for such a resin molded part which is required to have a certain mechanical strength, there has been used a mineral filler like talc which has a relatively large specific weight.

Therefore, in order to achieve a reduction in weight of the resin molded part which is formed from a resin material while maintaining the mechanical strength, it is considered to be effective to use a filler having a smaller specific weight.

Patent Document 1 discloses a technique to obtain a molded part from a resin composition which contains a polypropylene and a plant fiber.

PRIOR ART DOCUMENT

Patent Document

Patent Document 1: JP-A-2011-88997

SUMMARY OF THE INVENTION

Problem to be Solved by the Invention

However, in the case of a lamp body which is formed from a resin composition containing a base resin and a plant fiber, there is a problem that a mold which is used to mold the lamp body is corroded or that when the lamp body is used as a lamp, fogging or an appearance failure is caused on an inner side of a front cover during usage.

In view of these circumstances, the present invention is to provide a vehicle lamp using a lamp body which is formed from a resin composition containing a base resin and a plant fiber, and the vehicle lamp does not corrode a mold used to mold the lamp body, and when the lamp body is used as a lamp, does not cause fogging or appearance failure on an inner side of a front cover during usage.

Means for Solving the Problem

As a result of a thorough study, the inventors could solve the above-described problems by adopting the following configurations.

That is, the present invention provides:

(1) A vehicle lamp including a lamp body which is opened at a front thereof, and a front cover which is attached to the lamp body to close a front opening portion of the lamp body, wherein the lamp body is formed from a resin composition containing a base resin, a plant fiber, and an acid scavenger.

(2) The vehicle lamp according to (1), wherein the acid scavenger is calcium oxide.

(3) The vehicle lamp according to (1) or (2), wherein the content of the acid scavenger in the lamp body is 0.1 to 5 mass %.

(4) The vehicle lamp according to any one of (1) to (3), wherein the base resin is at least one selected from the group consisting of polypropylene, polyethylene, polylactic acid, polycarbonate, polyethylene terephthalate, polybutylene terephthalate, polystyrene, acrylonitrile-butadien-styrene copolymer, acrylonitrile-styrene-acrylate copolymer, acrylonitrile-ethylene-styrene copolymer, chlorinated polyethylene-acrylonitrile-styrene copolymer, polyamide, polyphenylene sulfide, liquid crystal polymer, polysulfone, epoxy resin, urethane resin, and silicone resin.

(5) The vehicle lamp according to any one of (1) to (4), wherein the plant fiber is at least one selected from the group consisting of pulp, jute hemp, Manila hemp, sisal hemp, ganpi, mitsumata, kozo, cedar, bamboo, cacao, kenaf, banana, pineapple, sugar cane, coconut palm, corn, bagasse, palm, reed, esparto, sabai grass, hemp palm, *Musa basjoo*, pine, mulberry, agave, wheat, rice, hinoki cypress, cellulose nanofiber, and cellulose fiber.

If the lamp body is formed from the resin composition containing the plant fiber, the mold used to mold the lamp body is corroded, and if a lamp is formed by using the lamp body, fogging or appearance failure is caused on an inner side of a front cover during usage. Although not clearly identified, the following are considered as the causes of those problems.

When the plant fibers are placed under a normal temperature and a normal pressure (an environment where temperature and humidity are not controlled), the plant fibers absorb moisture (water) in the ambient atmosphere and tend to be kept in a state where water is contained in the plant fibers. This will also be true in a state where the plant fibers are contained in a resin composition.

Incidentally, main components making up the plant fibers are cellulose (polysaccharide polymer and natural fiber), lignin (natural adhesive), and hemicelluloses (low-molecular substance of cellulose). Among them, lignin and hemicelluloses are thermally decomposed at high temperatures (about 200° C.) and generate a corrosive gas (organic acid such as carboxylic acid or the like). Decomposition starting temperatures of the individual components which make up the plant fiber are, for example, 120° C. for lignin, 200° C. for hemicellulose, 260° C. for cellulose.

When the lamp body is injection molded, the resin composition which contains the plant fibers flows within the mold at a high temperature and under a high pressure. As this occurs, in case water exists in the mold, corrosive gas and the mold (iron) react within the mold, generating organic acid salt (a reaction product of organic acid and iron) (rust of the mold). The reaction between the corrosive gas and the mold (iron) with water being present is activated more as the temperature and pressure become higher.

Further, when a lamp which uses the above lamp body is used, the temperature inside a lamp compartment of the lamp reaches 120 to 130° C. Under this temperature condition, a low-molecule organic substance (an oil components which volatilizes at around 130° C.) which is contained in the plant fibers gradually volatilizes to adhere (condense) on the inner side of the front cover which has the lowest temperature in the members which make up the lamp, whereby at least part of the front cover becomes white (gas fogging, external appearance failure). Further, in the case of the front cover to which a fog resisting paint is applied, the fog resisting function is reduced by the organic substance which has volatilized, whereby an appearance failure such as water sagging or sagging mark is generated on the inner side of the front cover.

In contrast, according to the present invention, since the lamp body which contains the plant fibers further contains the acid scavenger, it is presumed that the corrosive gas (acid) generated can be scavenged or neutralized by the acid scavenger (alkali) or that the thermal decomposition of the plant fibers can be prevented, so that generation of an acid substance is suppressed. Additionally, if calcium oxide (CaO) is used as an acid scavenger, when injection molding a lamp body, water can be trapped (changed to CaOH) with good efficiency by the high water absorption properties thereof, and therefore, it is presumed that the thermal decomposition or hydrolyzing of the plant fibers can be suppressed during injection molding (under high temperature and pressure). In addition, if a lamp is manufactured by using the lamp body which uses calcium oxide (CaO) as the scavenger, it is presumed that the generation of a volatile low molecular organic substance which causes fogging can be suppressed or can be trapped with good efficiency even though such a substance is generated.

Effects of the Invention

According to the present invention, corrosion of a mold used to mold a lamp body can be suppressed by adding further an acid scavenger to a material for a lamp body to be molded which contains a plant fiber. Further, corrosion of such a mold can be suppressed with better efficiency by using calcium oxide as an acid scavenger. In addition, if a lamp manufactured by using the lamp body, the resulting lamp would not cause fogging or appearance failure which would otherwise be generated on an inner side of a front cover of the lamp during usage.

BRIEF DESCRIPTION OF DRAWING

FIG. 1 is a schematic sectional view showing an example of a vehicle lamp according to the present invention.

DESCRIPTION OF EMBODIMENTS

Hereinafter, a preferred embodiment of a vehicle lamp according to the present invention will be described in detail.

An example of a vehicle lamp according to the present invention will be described by reference to a schematic sectional view shown in FIG. 1.

A vehicle lamp 1 according to the present invention includes a clear and transparent front cover 2 and a lamp body 3. A lamp unit 5 is supported in a lamp compartment 4 in the lamp body 3 which is defined by the front cover 2 and the lamp body 3 via an aiming mechanism 6. The lamp unit 5 shown in FIG. 1 includes a projection lens 8, a light source 10 and a reflector 13. Additionally, an extension 50 is disposed at the rear of the front cover 2 so as to cover an inner surface of the lamp body 3 such that the projection lens 8 is exposed.

The lamp body 3 which is used in the vehicle lamp according to the present invention (hereinafter, also referred to as the "lamp body of the present invention") will be described.

As described above, the lamp body 3 of the present invention has a shape which is opened at the front, and the front cover 2 is attached to a front opening portion of the lamp body 3.

Additionally, the lamp body 3 of the present invention is molded from a resin composition which contains a base resin, a plant fiber and an acid scavenger.

There is no specific limitation imposed on an acid scavenger used in the resin composition used to mold the lamp body 3 of the present invention, and there are exemplified stearic acid metallic salts of sodium, calcium, zinc and the like, compounds having a zeolite structure (synthetic or natural hydrotalcite), calcium, magnesium or zinc oxide or hydroxide, epoxy compounds, aliphatic amine, amino-substituted triazine, carbodiimide, and metallic salts of lactic acid or benzonic acid. Among them, CaO is preferable.

There is imposed no specific limitation on the content of the acid scavenger, and it is preferable to select an appropriate one depending upon the kind of an acid scavenger to be used, the kind of a plant fiber to be used together, the kind of a base resin, or the like. However, it is preferable to contain 0.1 to 10 mass % acid scavenger in the lamp body 3 of the present invention (a resin composition used to mold the lamp body 3), and it is more preferable to contain 0.1 to 5 mass % acid scavenger since an increase in water absorption rate associated with an increase in adding amount can be suppressed.

There is imposed on no specific limitation on plant fiber which is used in a resin composition used to mold the lamp body 3 of the present invention. There are exemplified pulp, jute hemp, Manila hemp, sisal hemp, ganpi, mitsumata, kozo, cedar, bamboo, cacao, kenaf, banana, pineapple, sugar cane, coconut palm, corn, bagasse, palm, reed, esparto, sabai grass, hemp palm, *Musa basjoo*, pine, mulberry, agave, wheat, rice, hinoki cypress, cellulose nanofiber, and cellulose fiber. Among them, pulp and jute hemp are preferable.

There is imposed no specific limitation on the content of the plant fiber, and it is preferable to select an appropriate one depending upon the kind of a plant fiber to be used, the kind of an acid scavenger to be used together, the kind of a base resin which will be described later, or the like. However, it is preferable to contain 5 to 80 mass % plant fiber in the lamp body 3 of the present invention (a resin composition used to mold the lamp body 3), and it is more preferable to contain 15 to 60 mass % acid scavenger to make the dynamic properties compatible with the moldability of the lamp body 3 to a sufficient level.

There is imposed on no specific limitation on the base resin which is used in a resin composition used to mold the lamp body 3 of the present invention. There are exemplified polypropylene (PP), polyethylene (PE), polylactic acid (PLA), polycarbonate (PC), polyethylene terephthalate (PET), polybutylene terephthalate (PBT), polystyrene (PS), acrylonitrile-butadien-styrene copolymer (ABS), acrylonitrile-styrene-acrylate copolymer (AAS), acrylonitrile-ethylene-styrene copolymer (AES), chlorinated polyethylene-acrylonitrile-styrene copolymer (ACS), polyamide (PA), polyphenylene sulfide (PPS), liquid crystal polymer (LCP), polysulfone (PSU), epoxy resin, urethane resin, and silicone resin. Among them, PP is preferable.

In preparing a resin composition to be used in molding the lamp body 3 of the present invention, kneading should be performed so that at least the base resin, the plant fiber and the acid scavenger are mixed uniformly.

There is imposed no specific limitation on a kneading method to be used then, and hence, a variety of kneading methods can be adopted, including a known screw kneading or the like.

The front cover 2 used in the present invention is clear and transparent, and therefore, there is imposed no specific limitation on a material therefor, as long as the front cover 2 can close the front opening portion of the lamp body 3 so as to define the lamp compartment. Thus, known materials can be used. There are exemplified, as specific ones, a clear thermoplastic resin such as polycarbonate, acrylic resin and polystyrene, a transparent inorganic material such as glass and the like.

EXAMPLES

Hereinafter, the present invention will be further described in detail by showing the results of evaluation tests carried out using examples according to the present invention and comparative examples. It should be noted that the present invention is not limited these examples.

Reference Example 1

Mixing and Pelleting Base Resin, Plant Fiber and Acid Scavenger

Polypropylene (PP) was used as a base resin, and jute hemp was added to the base resin so that the added jute resin was 25 mass % of a total amount of the jute hemp and the base resin. Also, calcium oxide (CaO) was added so that the calcium oxide added was 1 mass % of a total amount of the base resin and the jute hemp. The mixture was then kneaded.

After kneading, the mixture was extruded into pellets having an average diameter of 3 mm and an average length of 8 mm by using an extruding kneader.

(Drying of Pellets and Measurement of Water Absorption Rate)

The pellets obtained were dried for 24 hours at 90° C. The water absorption rate right after the pellets were dried was defined as 0%.

(Preparing Molded Part and Evaluating Mold Contamination)

The dried pellets were put into an injection molding machine (EC40N manufactured by Toshiba Machine Co., Ltd.) and were injection molded into a rectangular plate-shaped test piece having 110 mm×60 mm×3 mm at a cylinder temperature of 190° C. and a mold temperature of 40° C. In molding the rectangular plate-shaped test piece, a molding condition was used in which the pellets were filled insufficiently, so that corrosion gas was easily retained within an interior of the mold when generated thereon. 30 injection shots were made, and thereafter, the surface of the mold was observed visually. The result is shown in Table 1 below.

Example 1

Pellets were molded and were then dried for 24 hours at 90° C. Thereafter, the dried pellets were held for two hours in a constant-temperature and constant-humidity chamber of 95% RH at 60° C. to obtain a water absorption rate of 1.7%. Then, the pellets were molded into a molded part and a mold contamination evaluation was carried out on the resulting molded part in the same manners as those used in Reference Example 1.

Here, the water absorption rate was expressed as a percentage of an amount of absorbed water relative to a weight of the pellet right after the pellets were dried for 24 hours at 90° C. by using a difference between a pellet weight after the pellets were held in the constant-temperature and constant-humidity chamber and a pellet weight right after the pellets were dried for 24 hours at 90° C. as the amount of water absorption rate. The result is shown in Table 1 below.

Reference Example 2

Preparation of pellets, preparation of a molded part and a mold contamination evaluation were executed in the same manners as those used in Reference Example 1 except for addition of no calcium oxide in preparation of pellets. The result is shown in Table 1 below.

Comparative Example 1

Pellets were prepared with no calcium oxide added and the resulting pellets were held in the constant-temperature and constant-humidity chamber of 95% RH at 60° C. to obtain a water absorption rate of 0.9% (according the specification described in Example 1). Then, the pellets were molded into a molded part and a mold contamination evaluation was carried out on the resulting molded part in the same manners as those used in Reference Example 1. The result is shown in Table 1 below.

TABLE 1

| | CaO Added Amount (mass %) | Water Absorption Rate (%) | External Appearance after continuous shots |
|---|---|---|---|
| Reference Example 1 | 1 | 0 | No mold contamination after 30 shots |
| Example 1 | 1 | 1.7 | No mold contamination after 30 shots |
| Reference Example 2 | 0 | 0 | No mold contamination after 30 shots |
| Comparative Example 1 | 0 | 0.9 | Mold contaminated from second shot |

Mold contaminants produced in Comparative Example 1 were elemental-analyzed by a scanning analytical electron microscope (SEM-EDX). A large amount of Iron was detected, from which it was presumed that the mold was corroded.

Incidentally, in a condition where CaO (acid scavenger) was added, even though the pellets absorbed water, the mold was not contaminated (corroded). However, in a condition where no CaO was added, the mold was contaminated when the pellets absorbed water.

Example 2

Compositions of compounding ingredients used in preparing pellets were as shown in Table 2 below. Then, pellets and plate-shaped test pieces (molded parts) were prepared in the same manners as those used in Reference Example 1.

The plate-shaped test pieces prepared were placed at a bottom portion of a glass container, and a glass plate was placed on the glass container. Thereafter, a temperature at the bottom portion inside the glass container was controlled to 130° C. for 48 hours. This reproduced an environment of a headlamp when it was illuminated at high temperatures, so that gas generated from the plate-shaped test piece was attempted to adhere to the glass plate.

After the temperature control was completed, the glass plate was removed to measure Haze values, and the degree of gas generation (fogging) was evaluated. Haze values were measured by the following method. The results are shown in Table 2 below.

[Haze Value Measuring Method]

The glass plate was placed in a Haze meter (Haze Computer HZ-2 by Suga Test Instruments Co., Ltd.) to measure a Haze value (degree of fogging: fogging) (JIS K7105). In this measurement, the glass plate is fogged up more as more fogging is generated, and a Haze value is expressed by a larger number.

TABLE 2

|  |  | Condition 1 | Condition 2 | Condition 3 | Condition 4 |
|---|---|---|---|---|---|
| Compounding Ingredients Contents (mass %) | Polypropylene | 75 | 74.7 | 74 | 70 |
|  | CaO | 0 | 0.3 | 1 | 5 |
|  | Jute | 25 | 25 | 25 | 25 |
| Test Results | Fogging Test | Not Good | Good | Good | Good |
|  | Fog value (Haze value) | 8.6% | 0.1% | 0.4% | 0.3% |

It has been found that the generation of added gas is suppressed by CaO, as shown by the results in Table 2 above.

While the present invention has been described in detail by reference to the specific embodiment, it is obvious to those skilled in the art to which the invention pertains that various alterations and modifications can be made thereto without departing from the spirit and scope of the present invention.

This patent application is based on Japanese Patent Application (No. 2012-163470) filed on Jul. 24, 2012, the contents of which are incorporated herein by reference. Additionally, all the references cited herein are incorporated herein by reference.

INDUSTRIAL APPLICABILITY

According to the vehicle lamp of the present invention, corrosion of the mold used to mold the lamp body can be suppressed by containing further the acid scavenger in the lamp body which contains the plant fiber. Further, corrosion of the mold can be efficiently suppressed by using calcium oxide as the acid scavenger. In addition, when a lamp is manufactured by using the lamp body, the generation of fogging or appearance failure on the inner side of the front cover of the lamp can be suppressed during usage. Therefore, the vehicle lamp of the present invention is extremely useful as a vehicle lamp.

DESCRIPTION OF REFERENCE NUMERALS

1 Vehicle lamp
2 Front cover
3 Lamp body
4 Lamp compartment
5 Lamp unit
6 Aiming mechanism
8 Projection lens
10 Light source
13 Reflector
50 Extension.

The invention claimed is:

1. A vehicle lamp including a lamp body which is opened at a front thereof, and a front cover which is attached to the lamp body to close a front opening portion of the lamp body, wherein
the lamp body is formed from a resin composition containing a thermoplastic resin, a plant fiber, and an acid scavenger,
the acid scavenger is calcium oxide, and
the content of the acid scavenger in the lamp body is 0.1 to 5 mass %.

2. The vehicle lamp according to claim 1, wherein the thermoplastic resin is at least one selected from the group consisting of polypropylene, polyethylene, polylactic acid, polycarbonate, polyethylene terephthalate, polybutylene terephthalate, polystyrene, acrylonitrile-butadien-styrene copolymer, acrylonitrile-styrene-acrylate copolymer, acrylonitrile-ethylene-styrene copolymer, chlorinated polyethylene-acrylonitrile-styrene copolymer, polyamide, polyphenylene sulfide, liquid crystal polymer, and polysulfone.

3. The vehicle lamp according to claim 1, wherein the plant fiber is at least one selected from the group consisting of pulp, jute hemp, Manila hemp, sisal hemp, ganpi, mitsumata, kozo, cedar, bamboo, cacao, kenaf, banana, pineapple, sugar cane, coconut palm, corn, bagasse, palm, reed, esparto, sabai grass, hemp palm, Musa basjoo, pine, mulberry, agave, wheat, rice, hinoki cypress, cellulose nanofiber, and cellulose fiber.

4. The vehicle lamp according to claim 1, wherein the content of the acid scavenger in the lamp body is 0.1 to 2 mass %.

5. The vehicle lamp according to claim 1, wherein the content of the acid scavenger in the lamp body is 0.1 to 1 mass %.

* * * * *